(12) United States Patent
Maruyama et al.

(10) Patent No.: US 6,473,387 B1
(45) Date of Patent: Oct. 29, 2002

(54) OPTICAL DISC APPARATUS

(75) Inventors: Koichi Maruyama; Takashi Yamanouchi, both of Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 125 days.

(21) Appl. No.: 09/655,880

(22) Filed: Sep. 6, 2000

(30) Foreign Application Priority Data

Sep. 6, 1999 (JP) .......................................... 11-251993

(51) Int. Cl.7 ................................................ G11B 7/00
(52) U.S. Cl. .................................................. 369/112.23
(58) Field of Search ............................... 369/94, 44.37, 369/44.27, 44.12, 112.05, 112.08, 112.13, 112.23, 112.26, 53.2, 53.22, 53.23, 121, 44.14, 44.11, 112.01

(56) References Cited

U.S. PATENT DOCUMENTS

| | | | |
|---|---|---|---|
| 4,418,404 A | 11/1983 | Gordon et al. | |
| 4,432,079 A | 2/1984 | Mackelburg et al. | |
| 5,301,167 A | 4/1994 | Proakis et al. | |
| 5,449,112 A | 9/1995 | Heitman et al. | |
| 5,539,705 A | 7/1996 | Akerman et al. | |
| 5,615,200 A | * 3/1997 | Hoshino et al. | 369/112.1 |
| 5,664,020 A | 9/1997 | Goldfarb et al. | |
| 5,883,747 A | 3/1999 | Yamazaki et al. | |
| 6,072,579 A | * 6/2000 | Funato | 369/112.15 |
| 6,088,322 A | 7/2000 | Broome et al. | |
| 6,091,691 A | * 7/2000 | Yoo et al. | 369/112.26 |
| 6,118,597 A | 9/2000 | Maruyama et al. | |

FOREIGN PATENT DOCUMENTS

| | | | |
|---|---|---|---|
| JP | 09306018 A | * | 11/1997 |
| JP | 11016194 A | * | 1/1999 |

OTHER PUBLICATIONS

Article published in the periodical, "Nikkei Communications", (No. 746), Jun. 26, 1996, pp. 29 and 30.

* cited by examiner

Primary Examiner—Thang V. Tran
(74) Attorney, Agent, or Firm—Greenblum & Bernstein, P.L.C.

(57) ABSTRACT

Disclosed is an optical disc apparatus that is adapted for DVD, CD and CD-R. The optical system includes a laser module and an objective lens that converges a divergent laser beam emitted from the laser module onto information layers of optical discs. The laser module is provided with a pair of emission points that are in close proximity to each other, and a pair of light receiving elements. A focusing mechanism moves the objective lens so that the beam spot follows an information layer of the optical disc. The objective lens is provided with the diffractive lens structure to have a wavelength dependence such that the spherical aberration varies in response to the change of the wavelength. Thereby, the variation of the spherical aberration due to the change of the thickness of the cover layer can be canceled by changing the wavelength.

10 Claims, 6 Drawing Sheets

SPHERICAL
ABERRATION
SINE
CONDITION

SPHERICAL
ABERRATION
CHROMATIC
ABERRATION

ASTIGMATISM

NA=0.45

—— SA
- - SC

-0.002  0.002

SPHERICAL
ABERRATION
SINE
CONDITION

NA=0.45

—— 785 nm
······ 775 nm
- - - 795 nm

-0.002  0.002

SPHERICAL
ABERRATION
CHROMATIC
ABERRATION

Y=0.060

—— S
- - M

-0.002  0.002

ASTIGMATISM 20, 30, 31

SPHERICAL
ABERRATION
SINE
CONDITION

SPHERICAL
ABERRATION
CHROMATIC
ABERRATION

ASTIGMATISM

SPHERICAL
ABERRATION
SINE
CONDITION

SPHERICAL
ABERRATION
CHROMATIC
ABERRATION

ASTIGMATISM

SPHERICAL
ABERRATION
SINE
CONDITION

SPHERICAL
ABERRATION
CHROMATIC
ABERRATION

ASTIGMATISM

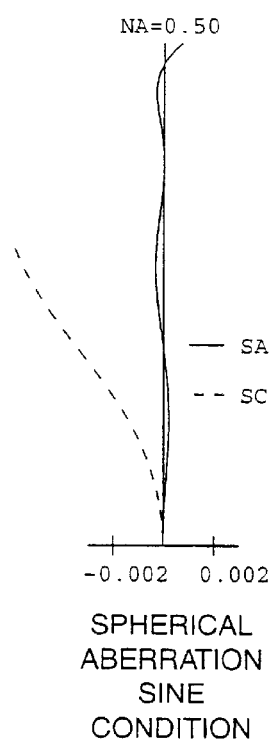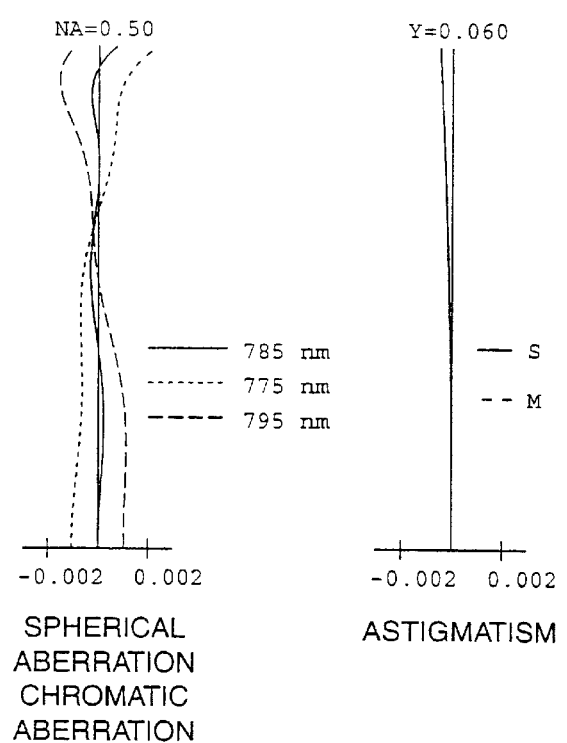

OPTICAL DISC APPARATUS

BACKGROUND OF THE INVENTION

The present invention relates to an optical disc apparatus that is capable of using a plurality of kinds of optical discs whose cover layers are different in thickness.

The optical disc apparatus includes a turntable that rotates the optical disc mounted thereon and an optical pick-up that reproduces recorded information from the optical disc and/ or records information onto the optical disc. The optical pick-up is provided with a laser source such as a semiconductor laser, an objective lens that converges the laser beam emitted from the laser source and a light receiving portion that receives a beam reflected by the optical disc. The optical pick-up is movable in a radial direction of the optical disc.

The optical disc includes an information layer on which digital information is recorded, and a transparent cover layer that covers the information layer.

A laser beam from the laser source is converged by the objective lens and forms a beam spot on the information layer through the cover layer. The light receiving portion receives the reflected beam from the optical disc to produce a focusing error signal, a tracking error-signal and a reproducing signal.

There are a few types of the optical discs. A CD (compact disc) or a CD-R (CD recordable) has the cover layer whose thickness is 1.2 mm, and the thickness of the cover layer of a DVD (digital versatile disc) is 0.6 mm. Recording density of a DVD is higher than that of a CD or a CD-R.

Such a difference of thickness of the cover layer changes the relative position of the information layer with respect to the turntable, i.e., the distance between the optical pick-up and the information layer. Namely, the thicker the cover layer is, the greater the distance to the information layer from the optical pick-up is. For example, the optical pick-up is required to move the beam spot away from the optical pick-up by 0.6 mm in the cover layer, which is equivalent to 0.4 mm in air, when the DVD is replaced with a CD or a CD-R.

In order to be adapted for a plurality of kinds of optical discs whose cover layers are different in thickness, a conventional optical disc apparatus is equipped with a plurality of optical pick-ups to be selectably employed in accordance with the thickness of the cover layer. As the other conventional optical disc apparatus, there has been one which is equipped with a plurality of objective lenses to be selectably employed. However, the conventional optical disc apparatuses that include a plurality of optical pick-ups or objective lenses increase the total size of the apparatus. Therefore, it is preferable to use a common optical pick-up and a common objective lens to make the apparatus compact.

When a common optical pick-up and a common objective lens are used, there are two ways to move the beam spot in an optical axis direction according to the change of the thickness of the cover layer. The first way is to move the optical pick-up in the optical axis direction. The second way is to change the distance between the light source and the objective lens. However, the first way has such a disadvantage that a large moving mechanism is required for focusing.

The second way is effective for an optical disc apparatus that employs a plurality of separate semiconductor lasers elements. A compatible optical disc apparatus for CD, CD-R and DVD is provided with a first semiconductor laser whose emission wavelength is 635 nm through 660 nm and a second semiconductor laser whose emission wavelength is 780 nm through 830 nm.

The reasons why the optical disc apparatus needs the first and second semiconductor lasers are differences in recording density and reflection characteristics of the optical discs. The recording density of a DVD is higher than that of a CD, which requires to form a smaller beam spot on a DVD than the beam spot formed on a CD. Since the diameter of the beam spot becomes smaller as the wavelength of the laser beam decreases, the optical pick-up for a DVD requires the laser source whose emission wavelength is 635 through 660 nm. On the other hand, the reflection characteristics of a CD-R requires the laser source whose emission wavelength is 780 nm through 830 nm. When the optical disc apparatus includes a pair of semiconductor laser elements, the semiconductor laser elements can be positioned such that the distances between the semiconductor laser elements and the optical disc are different to each other.

However, the second way is not applicable to an optical disc apparatus that employs a module where semiconductor lasers and light receiving elements are mounted on a single circuit board. Such a module is disclosed in pages 29 and 30 of "Nikkei Electronics 1999.6.26 (No. 746)". In the module, two active layers having different characteristics are formed on a single chip that emit laser beams at 650 nm and 780 nm, respectively. The active layer has a point from which the laser beam is emitted. This point is referred to as an emission point. The module has a pair of the emission points.

When a plurality of emission points are formed in close proximity to each other as described above, since the distances between the respective emission point and the surface of the cover layer is identical even if the thickness of the cover layer varies, the second way is not applicable.

SUMMARY OF THE INVENTION

It is therefore an object of the present invention to provide an optical system of an optical disc apparatus capable of adapting to a plurality of kinds of optical discs whose cover layers are different in thickness without moving the whole system of the optical pick-up even when the emission points are formed in close proximity to each other.

For the above object, according to the present invention, there is provided an improved optical disc apparatus that is adapted for a plurality of kinds of optical discs whose cover layers are different in thickness, which includes a light source portion that has a plurality of emission points in close proximity to each other, an objective lens for converging divergent laser beam from the light source portion onto an information layer of the optical disc through the cover layer thereof, a light receiving portion that receives the reflected light beam from the optical disc to produce signals, and a focusing mechanism that moves the objective lens. The emission points emit divergent laser beams at different wavelengths, respectively, and the emission points are switched in accordance with the thickness of the cover layer. The distances between the respective emission points and the surfaces of the cover layers are constant regardless of the thickness of the cover layer.

Further, the focusing mechanism moves the objective lens such that the distance between the objective lens and the optical disc increases as the thickness of the cover layer decreases. That is, since the information layer is positioned behind the cover layer, the information layer becomes farther from the light source portion as the thickness of the cover layer increases. Therefore, when the distance between the objective lens and the optical disc changes as described above, the beam spot follows the information layer.

With this construction, the beam spot moves in the optical axis direction by moving the objective lens in accordance with the thickness of the cover layer, which brings the beam spot to be coincident with the information layer of the optical disc.

Although a paraxial beam spot moves as the objective lens is moved, the change of the thickness of the cover layer changes spherical aberration. If the optical disc apparatus only moves the objective lens when the disc is replaced, wave front aberration of the laser beam is deteriorated, thereby the diameter of the beam spot increases, which prevents the optical disc apparatus from reproducing the recorded information from the optical disc.

Therefore, it is preferable to give wavelength dependence to the objective lens such that spherical aberration varies as wavelength of incident laser beam varies, thereby canceling the variation of the spherical aberration caused by the change of the thickness of the cover layer.

The wavelength dependence of the spherical aberration can be achieved by adding a diffractive lens structure formed on either lens surface of the objective lens. Since the recording density of a DVD having the thinner cover layer is higher than a CD or CD-R having the thicker cover layer, a first wavelength of the laser beam for the optical disc having a thin cover layer should be smaller than a second wavelength of the laser beam for the optical disc having a thick cover layer. Therefore, the diffractive lens structure should have the wavelength dependence such that a predetermined order diffraction light at the first wavelength forms an appropriate wavefront for the optical disc having the thin cover layer and the same order diffraction light at the second wavelength forms an appropriate wavefront for the optical disc having the thick cover layer.

Further, since the spherical aberration varies in an overcorrected direction as the thickness of the cover layer increases, the diffractive lens structure is preferable to have the wavelength dependence such that the spherical aberration varies in an undercorrected direction as the wavelength of the incident light increases. An additional optical path length added by a diffractive lens structure is expressed by the following optical path difference function $\Phi(h)$:

$$\Phi(h)=(P_2h^2+P_4h^4+P_6h^6+\ldots)\times\lambda$$

where $P_2$, $P_4$ and $P_6$ are diffractive coefficients of second, fourth and sixth orders, h is the height from the optical axis and $\lambda$ is wavelength of incident light.

The objective lens embodying the invention may satisfy the following condition (1);

$$-15<\Phi(h_{45})/\lambda-P_2\times(h_{45})^2<-10 \qquad (1)$$

where $h_{45}$ is the h where a light ray whose NA is 0.45 intersects the diffractive lens structure.

Still further, it is preferable that the focal length of the objective lens at the first wavelength used for the optical disc having the thin cover layer is shorter than the focal length of the objective lens at the second wavelength used for the optical disc having the thick cover layer.

Yet further, it is preferable that the diffractive lens structure has a negative lens power, i.e., the second order coefficient $P_2$ of the optical path difference function has a positive value. The lens power is defined as a power that converges or diverges the light beam. The lens power of the objective lens is determined as a total sum of the lens power of the refractive lens and the lens power of the diffractive lens structure. Since the objective lens converges the divergent laser beam onto the optical disc, the total lens power is positive. And thus the refractive lens has a large positive power, i.e., a positive short focal length. However, if the total lens power becomes too large, the moving amount of the objective lens when the optical disc is replaced becomes too large, which increases burden on the moving mechanism. When the diffractive lens structure has the negative lens power as described above, the total lens power becomes smaller, which reduces the moving amount of the objective lens.

The light source portion may be provided with two emission points on one chip. Further, it is preferable that the light receiving portion is mounted on the board on which the light source portion is mounted for compact design.

Description of the Accompanying Drawings

FIGS. 11A, 11B and 11C are graphs showing various aberrations of the optical system shown in FIG. 9 when the second optical disc is applied.

DESCRIPTION OF THE EMBODIMENTS

Figure 1A:
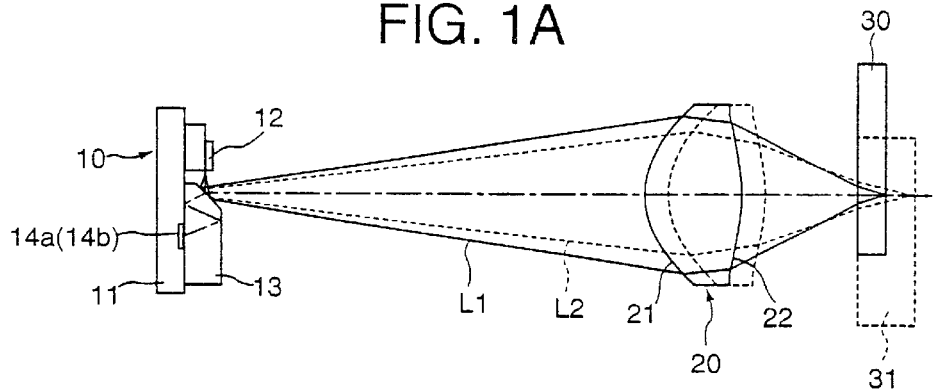
FIG. 1A shows the entire optical system of an optical disc apparatus embodying the invention.
Figure 1B:
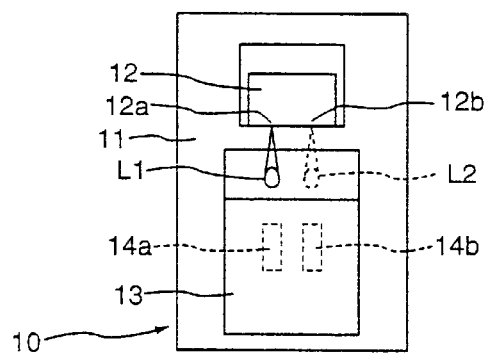
FIG. 1B is a plan view of a laser module installed in the optical disc apparatus of FIG. 1A.

An optical disc apparatus embodying the invention will be described with reference to drawings. FIG. 1A shows the optical system of a compatible optical disc apparatus that is adapted for DVD, CD or CD-R embodying the invention, and FIG. 1B is an enlarged plan view of an laser module installed in the optical disc apparatus of FIG. 1A.

The optical system of the optical disc apparatus includes a laser module 10 that functions as a light source as well as a light receiving element, and an objective lens 20 that converges a divergent laser beam emitted from the laser module 10 onto information layers of optical discs 30 and 31.

The laser module 10 is the same as the module disclosed in pages 29 and 30 of "Nikkei Electronics 1999.6.28 (No. 746)". On a silicon board 11, one chip semiconductor laser 12, a prism 13 and a pair of light receiving elements 14a and 14b are mounted. The semiconductor laser 12 has two active layers having different characteristics formed on a single chip that emit laser beams at 660 nm and 785 nm, respectively. The active layer has a point from which the laser beam is emitted. This point is referred to as an emission point. The module 10 has first and second emission points 12a and 12b. The emission points 12a and 12b are in close proximity to each other, i.e., the distance between the emission points is about 100 μm.

A laser beam emitted from the first emission point 12a or the second emission point 12b is reflected by an angled surface 13a of the prism 13 at 45 degrees, and is incident on the objective lens 20 as a divergent light. The objective lens 20 converges the divergent light beam onto an information layer of the optical disc 30 or an information layer of the optical disc 31. The objective lens 20 is supported by a focusing mechanism and a tracking mechanism. The focusing mechanism moves the objective lens 20 in the optical axis direction thereof. The tracking mechanism moves the objective lens 20 in the radial direction of the optical disc. These focusing and tracking mechanisms are well-known and are not illustrated in the drawings.

The optical disc 30 is defined as "a first optical disc" that has a thin cover layer and high recording density such as a DVD. The optical disc 31 is defined as "a second optical disc" that has a thick cover layer and low recording density such as a CD or a CD-R. The first optical disc 30 is illustrated by a solid line and the second optical disc 31 is illustrated by a dashed line in the drawings.

When the first optical disc 30 is applied, the laser beam L1 at the first wavelength 660 nm emitted from the first emission point 12a is used to form a relatively small beam spot. When the second optical disc 31 is used, the laser beam L2 at the second wavelength 785 nm emitted from the second emission point 12b is used by considering the reflection characteristics of a CD-R.

Each of the optical discs 30 and 31 is to be mounted on a turntable such that the surface of the cover layer at the objective lens 20 side contacts the turntable. Further, the two emission points 12a and 12b are located at the same position in the direction along which the laser beam propagates. Therefore, the distance between the respective emission points and the surfaces of the cover layers are constant regardless of the thickness of the cover layer. However, since the position of the information layer changes in accordance with the thickness of the cover layer, the focusing mechanism moves the objective lens 20 so that the position of the beam spot follows the position of the information layer.

In other words, when the first optical disc 30 is applied, the objective lens 20 is located at the position illustrated by the solid line in FIG. 1A, and the objective lens 20 converges the laser beam L1 (shown by the solid line) of wavelength 660 nm onto the information layer of the first optical disc 30. On the other hand, when the second optical disc 31 is applied, the objective lens 20 is located at the position illustrated by the dashed line that is relatively closer to the optical disc 31, and the objective lens 20 converges the laser beam L2 (shown by the dashed line) of wavelength 785 nm onto the information layer of the second optical disc 31.

The reflected laser beam from the information layer is converted into the convergent beam through the objective lens 20 and returns back to the laser module 10. A part of the returned beam passing through the angled surface 13a of the prism 13 is internally reflected twice in the prism 13 and is incident on either of the first and second light receiving elements 14a and 14b. The laser beam emitted from the first emission point 12a is incident on the first light receiving element 14a, and the laser beam emitted from the second emission point 12b is incident on the second light receiving element 14b. Each of the first and second light receiving elements 14a and 14b has a plurality of detection areas. Reproduced signal recorded in the optical disc, focusing error signal and tracking error signal are produced by calculation based on received light amounts of the respective detection areas.

Figure 2A:
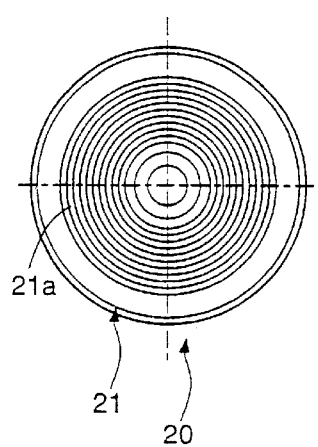
FIG. 2A is a front view of an objective lens embodying the invention.
Figures 2B, 2C:
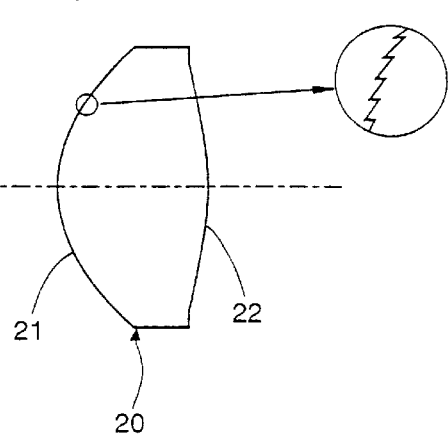
FIG. 2B is a vertical cross-sectional view of an objective lens of FIG. 2A.
FIG. 2C is an enlarged view of FIG. 2B.

Next, detail of the objective lens 20 will be described with reference to FIGS. 2A, 2B and 2C. FIG. 2A is a front view of the objective lens 20, FIG. 2B is a vertical cross-sectional view of the objective lens 20 and FIG. 2C is an enlarged partial view of FIG. 2B. The objective lens 20, which is made from plastic such as PMMA (Polymethylmethacrylate), is a biconvex lens having first and second aspherical surfaces 21 and 22. The diffractive lens structure 21a is formed on the first surface 21. As shown in FIG. 2A, the diffractive lens structure 21a has a plurality of concentric rings. Each of the boundaries between the adjacent rings is formed as a step in the optical axis direction giving a predetermined optical path difference.

When the first optical disc 30 is replaced with the second optical disc 31, the thickness of the cover layer increases, which changes the spherical aberration of the optical system including the objective lens 20 and the optical disc 30 or 31. The spherical aberration changes in the overcorrected direction as the thickness of the cover layer increases. Further, when the objective lens 20 moves along the optical axis for focusing, the spherical aberration varies. The spherical aberration changes in the overcorrected direction as the objective lens 20 moves away from the laser module 10 and close to the optical disc 30 or 31 (i.e., as the object distance increases).

Therefore, if the spherical aberration of the optical system including the objective lens 20 and the first optical disc 30 is corrected and the diffractive lens structure 21a is not formed, the spherical aberration becomes overcorrected when the second optical disc 31 is applied, because the thickness of the cover layer increases and the object distance becomes longer. Accordingly, if the objective lens, which does not have the diffractive lens structure, moves in the optical axis direction when the first optical disc 30 is replaced with the second optical disc 31, the wavefront of the laser beam will be deteriorated, whereby it is difficult to converge the laser beam into the required spot size.

To overcome the above described problem, the objective lens 20 is provided with the diffractive lens structure 21a. The diffractive lens structure 21a has a wavelength dependence such that the spherical aberration varies in the undercorrected direction as the wavelength increases. As a result, the objective lens 20 forms an appropriate wavefront when the second optical disc 31 is applied. Namely, the diffractive lens structure 21a has the wavelength dependence such that a predetermined order diffraction light of wavelength 660 nm forms an appropriate wavefront for the first optical disc 30 and the same order diffraction light of wavelength 785 nm forms an appropriate wavefront for the second optical disc 31.

An additional optical path length added by a diffractive lens structure is expressed by the following optical path difference function $\Phi(h)$:

$$\Phi(h)=(P_2h^2+P_4h^4+P_6h^6+\ldots)\times\lambda$$

where $P_2$, $P_4$ and $P_6$ are coefficients of second, fourth and sixth orders, h is the height from the optical axis and $\lambda$ is the wavelength of incident light. The function $\Phi(h)$ represents an optical path difference between an imaginary ray that is assumed not to be diffracted by the diffracting lens structure and a ray that is diffracted by the diffractive lens structure, at a point on the diffractive lens structure where the height from the optical axis is h. In such an expression, a negative value of the second order coefficient $P_2$ represents a positive paraxial power of the diffractive lens structure. Further, the negative power increases with the increase of the distance from the optical axis when the fourth order coefficient $P_4$ is larger than zero.

An actual microscopic shape of the diffractive lens structure is defined having a large number of concentric rings.

The actual shape $\Phi(h)$ is defined by subtracting $\lambda \times m$ (m integer) from $\Phi(h)$ as follows.

$$\Phi(h)=(MOD(P_2h^2+P_4h^4+\ldots+C,1)-C)\times\lambda_B$$

Symbol $\lambda_B$ is a blaze wavelength for which the steps of the grating give an optical path difference that is one wavelength long, and the diffractive efficiency becomes the maximum at the blaze wavelength $\lambda_B$. Symbol C is a constant defining a phase difference at a boundary between adjacent rings with respect to the point on the optical axis where $\Phi(h)$ equals 0 (0=C<1). The function MOD(x, y) represents the remainder when x is divided by. $MOD(P_2h^2+P_4h^4+\ldots+C,1)$ is equal to zero at the boundary. The diffractive lens structure is formed on the base curve that is the lens surface of the refractive lens. Inclinations and steps of the ring areas are designed such that the optical path differences are defined by $\Phi(h)$. The relationship between $\Phi(h)$ and $\Phi'(h)$ is set forth-in Appendix A, the entire contents of which is incorporated herein by reference in its entirety.

The objective lens 20 of the embodiment satisfies the following condition (1);

$$-15<\Phi(h_{45})/\lambda-P_2\times(h_{45})^2<-10 \quad (1)$$

where $h_{45}$ is the height from the optical axis of a point where a light ray whose NA is 0.45 intersects the diffractive lens structure.

The condition (1) defines the spherical aberration correcting function of the diffractive lens structure that is found by subtracting the power component $P_2\times(h_{45})^2$ from the total optical function $\Phi(h_{45})/\lambda$. Since the peripheral beam whose NA is larger than 0.45 is not used for the second optical disc 31, the condition (1) uses the value at NA 0.45 as the reference. When the condition (1) is satisfied, the variation of the spherical aberration due to change of the cover layer thickness and change of the object distance can be effectively canceled by the variation of the spherical aberration of the diffractive lens structure due to the wavelength change.

If the intermediate term of the condition (1) becomes lower than −15, the spherical aberration correcting function by the diffractive lens structure becomes too large, which causes the spherical aberration to become undercorrected. Further, the variation of the spherical aberration due to change of the wavelength becomes too large, which narrows the allowance for individual difference of the emission wavelength of the semiconductor laser.

On the other hand, when the intermediate term of the condition (1) exceeds −10, the spherical aberration correcting function by the diffractive lens structure becomes too small, which causes the spherical aberration to become overcorrected. Further, since the variation of the spherical aberration due to change of the wavelength becomes too small, it becomes difficult to correct the variation of the spherical aberration due to the change of the thickness of the cover layer and the variation of the spherical aberration due to the movement of the objective lens 20.

It should be noted that the focal length of the objective lens 20 at wavelength 660 nm used for the first optical disc 30 is shorter than the focal length of the objective lens 20 at wavelength 785 nm used for the second optical disc 31. Since the cover layer of the second optical disc 31 is thicker than the first disc 30, the distance between the objective lens 20 and the information layer becomes longer for the second optical disc 31 as compared with for the first optical disc 30. Therefore, when the focal length at wavelength 785 nm is longer than that at wavelength 660 nm as described above, the moving amount of the objective lens when the first optical disc 30 is replaced with the second optical disc 31 becomes small.

Three embodiments will be described hereinafter. Since the laser module 10 is common in these embodiments, only the constructions of the objective lenses will be described. The objective lenses of the embodiments are used in the optical disc apparatus that is capable of adapting the first optical disc 30 whose cover layer is 0.6 mm in thickness and the second optical disc 31 whose cover layer is 1.2 mm in thickness. The diffractive lens structure is formed on the first surface 21 in every embodiment.

First Embodiment

Figure 3:
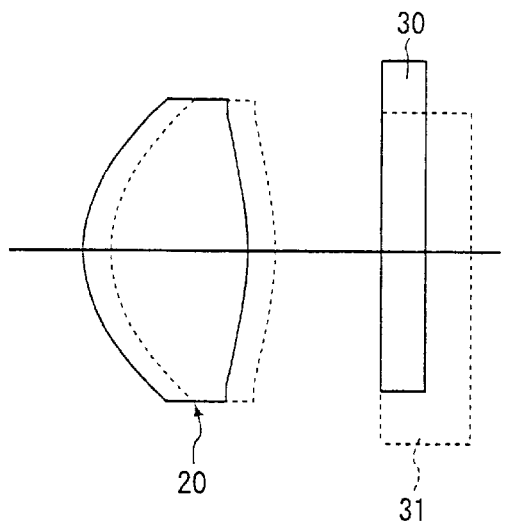
FIG. 3 shows the objective lens of a first embodiment and the optical discs.

FIG. 3 shows the objective lens 20 of the first embodiment and the first and second optical discs 30 and 31. When the first optical disc 30 (shown as a solid line) is applied, the objective lens 20 is located at a position that is far from the optical disc as illustrated by a solid line. On the other hands when the second optical disc 31 (shown as a dashed line) is applied, the objective lens 20 is located at a position that is close to the optical disc as illustrated by a dashed line.

The numerical figures of the objective lens 20 of the first embodiment are described in TABLE 1. The surface #0 represents a plane in which the emission points are located. The surfaces #1 and #2 represent the incident and exit surfaces of the objective lens 20, respectively. The surface #3 represents the surface of the cover layer at the objective lens side and the surface #4 represents the information layer of the optical disc.

In TABLE 1, $\lambda_1$, $NA_1$, $f_1$, $M_1$ and $d_1$ denote wavelength (unit:nm) of the laser beam, numerical aperture, a resultant focal length (unit:mm) of the objective lens 20 that is determined by the lens powers of the refractive lens and the diffractive lens structure, a magnification and a distance (unit:mm) between adjacent surfaces, respectively, when the first optical disc 30 is applied. On the other hand, $\lambda_2$, $NA_2$, $f_2$, $M_2$ and $d_2$ denote wavelength (unit:nm) of the laser beam, numerical aperture, the resultant focal length (unit:mm) of the objective lens 20, a magnification and a distance (unit:mm) between adjacent surfaces, respectively, when the second optical disc 31 is used. Further, $h_{45}$ denotes the height (unit:mm) from the optical axis of a point where a light ray whose NA is 0.45 intersects the diffractive lens structure, r denotes the paraxial radius of curvature (unit:mm) and $n\lambda$ denotes the refractive index at a wavelength $\lambda$ nm.

Both of the first surface 21 (surface #1) and the second surface 22 (surface #2) of the objective lens 20 are rotationally-symmetrical aspherical surfaces. The rotationally-symmetrical aspherical surface is expressed by the following equation:

$$X(h) = \frac{h^2 c}{1 + \sqrt{1 - (1+K)h^2 c^2}} + A_4 h^4 + A_6 h^6 + A_8 h^8 + A_{10} h^{10} + A_{12} h^{12}$$

X(h) is a sag, that is, a distance of a curve from a tangential plane at a point on the surface where the height from the optical axis is h. Symbol c is a curvature (1/r) of the vertex of the surface, K is a conic constant, $A_4, A_6, A_8, A_{10}$ and $A_{12}$ are aspherical surface coefficients of fourth, sixth, eighth, tenth and twelfth orders, respectively. The constant K and coefficients $A_4$ through $Al_2$ and the coefficients of the optical path difference function that define the diffractive lens structure are shown in the following TABLE 2.

TABLE 1

$\lambda_1 = 660$ nm  $NA_1 = 0.60$  $f_1 = 2.739$  $M_1 = -0.2065$  $h_{45} = 1.46$ mm
$\lambda_2 = 785$ nm  $NA_2 = 0.45$  $f_2 = 2.765$  $M_2 = -0.2030$

| Surface number | r | $d_1$ | $d_2$ | n660 | n785 |
|---|---|---|---|---|---|
| #0 |  | 15.000 | 15.363 |  |  |
| #1 | 1.847 | 2.170 | 2.170 | 1.54044 | 1.53665 |
| #2 | −3.609 | 1.761 | 1.398 |  |  |
| #3 | ∞ | 0.600 | 1.200 |  |  |
| #4 | ∞ |  |  |  |  |

TABLE 2

|  | First Surface | Second Surface |
|---|---|---|
| K | −0.560 | 0.000 |
| $A_4$ | −9.304 × 10⁻³ | 2.865 × 10⁻³ |
| $A_6$ | 2.816 × 10⁻⁴ | 1.932 × 10⁻² |
| $A_8$ | 3.054 × 10⁻⁵ | −2.424 × 10⁻³ |
| $A_{10}$ | −3.441 × 10⁻⁵ | 6.067 × 10⁻⁴ |
| $A_{12}$ | −6.281 × 10⁻⁶ | −5.228 × 10⁻⁵ |
| $P_2$ | 5.000 |  |
| $P_4$ | −2.887 |  |
| $P_6$ | 7.500 × 10⁻³ |  |

Figure 4A:
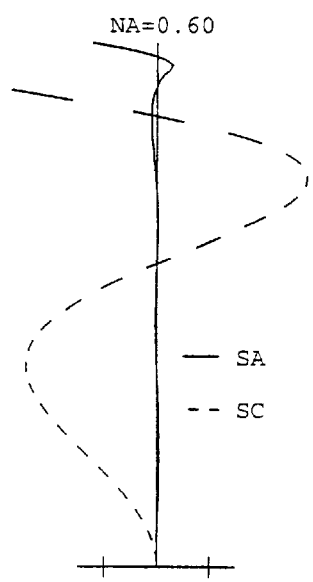
FIGS. 4A, 4B and 4C are graphs showing various aberrations of the optical system in shown FIG. 3 when a first optical disc is applied.
Figure 4B:
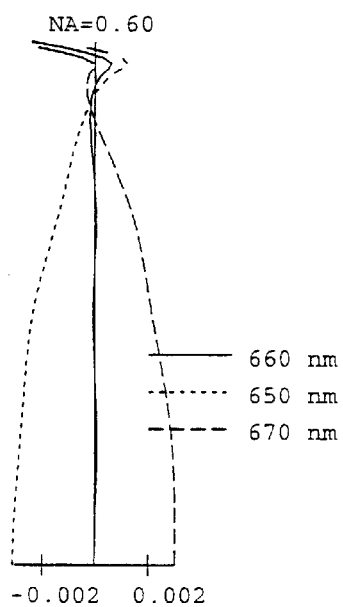
Figure 4C:
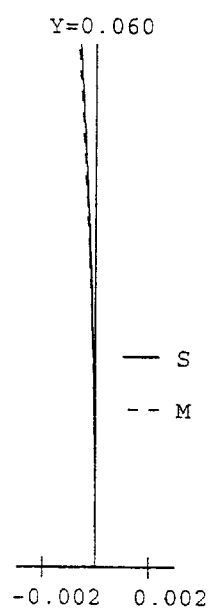

FIGS. 4A, 4B and 4C are graphs showing various aberrations of the optical system shown in FIG. 3 when the first optical disc 30 is applied. FIG. 4A shows spherical aberration SA and sine condition SC at wavelength 660 nm, FIG. 4B shows chromatic aberration represented by the spherical aberrations at wavelengths 650 nm,660 nm and 670 nm, and FIG. 4C shows astigmatism (S: Sagittal, M: Meridional). The vertical axes of FIGS. 4A and 4B represent numerical aperture NA and the vertical axis of FIG. 4C represents an image height Y (unit:mm). Further, horizontal axes represent amount of aberrations (unit:mm).

Figure 5A:
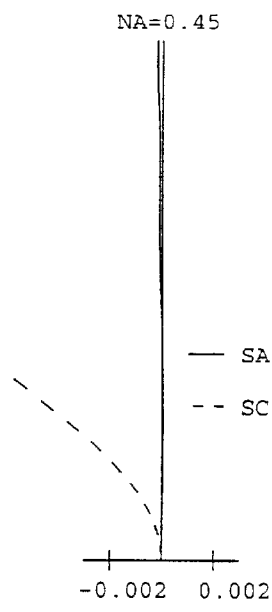
FIGS. 5A, 5B and 5C are graphs showing various aberrations of the optical system shown in FIG. 3 when a second optical disc is applied.
Figure 5B:
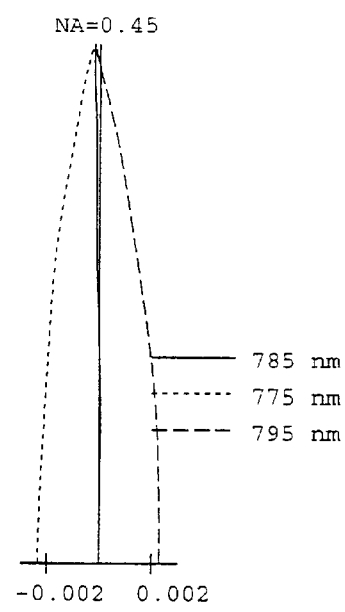
Figure 5C:
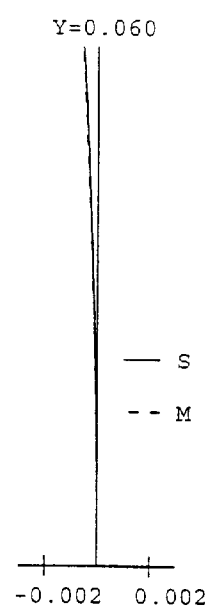

FIGS. 5A, 5B and 5C show the similar aberrations of the optical system shown in FIG. 3 when the second optical disc 31 is applied. The wavelength in FIG. 5A is 785 nm and the wavelengths in FIG. 5B are 775 nm, 785 nm and 795 nm. In view of FIGS. 4A and 5A, it has become clear that the spherical aberrations are well corrected at the wavelengths λ1 and λ2.

Further, the diffractive lens structure of the first embodiment has a negative lens power in paraxial area because the second order coefficient $P_2$ of the optical path difference function has a positive value. When the diffractive lens structure has the negative lens power, the resultant focal length of the objective lens 20 including the diffractive lens structure becomes long, which reduces the moving amount of the objective lens 20 when the optical disc is replaced, decreasing a load on the focusing mechanism.

Second Embodiment

Figure 6:
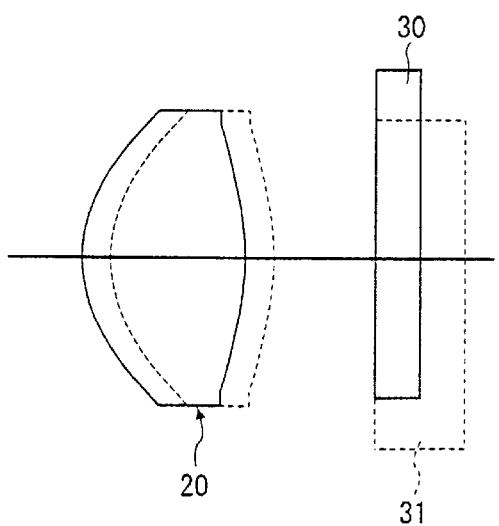
FIG. 6 shows the objective lens of a second embodiment and the optical discs.

FIG. 6 shows the objective lens 20 of the second embodiment and the first and second optical discs 30 and 31. When the first optical disc 30 is used, the objective lens 20 is located at a position illustrated by a solid line. On the other hand, when the second optical disc 31 is used, the objective lens 20 is located at a position illustrated by a dashed line.

The numerical figures of the objective lens 20 of the second embodiment are described in TABLE 3. The constant K and coefficients $A_4$ through $A_{12}$ and the coefficients of the optical path difference function that define the diffractive lens structure are shown in the following TABLE 4.

TABLE 3

$\lambda_1 = 660$ nm  $NA_1 = 0.60$  $f_1 = 2.6045$  $M_1 = -0.252$  $h_{45} = 1.43$ mm
$\lambda_2 = 785$ nm  $NA_2 = 0.45$  $f_2 = 2.6213$  $M_2 = -0.244$

| Surface number | r | $d_1$ | $d_2$ | n660 | n785 |
|---|---|---|---|---|---|
| #0 |  | 12.000 | 12.384 |  |  |
| #1 | 1.842 | 2.200 | 2.200 | 1.54044 | 1.53665 |
| #2 | −3.126 | 1.734 | 1.350 |  |  |
| #3 | ∞ | 0.600 | 1.200 |  |  |
| #4 | ∞ |  |  |  |  |

TABLE 4

|  | First Surface | Second Surface |
|---|---|---|
| K | −0.560 | 0.000 |
| $A_4$ | −1.000 × 10⁻² | 4.045 × 10⁻² |
| $A_6$ | 4.380 × 10⁻⁴ | −5.453 × 10⁻³ |
| $A_8$ | −1.910 × 10⁻⁴ | −4.347 × 10⁻⁴ |
| $A_{10}$ | 3.000 × 10⁻⁵ | 1.758 × 10⁻⁴ |
| $A_{12}$ | −1.700 × 10⁻⁵ | −1.337 × 10⁻⁵ |
| $P_2$ | 0.000 |  |
| $P_4$ | −3.210 |  |
| $P_6$ | 1.890 × 10⁻² |  |

Figure 7A:
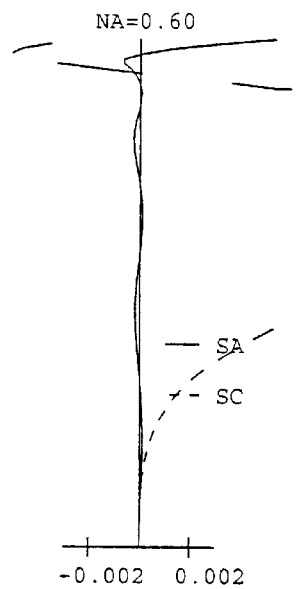
FIGS. 7A, 7B and 7C are graphs showing various aberrations of the optical system shown in FIG. 6 when the first optical disc is applied.
Figure 7B:
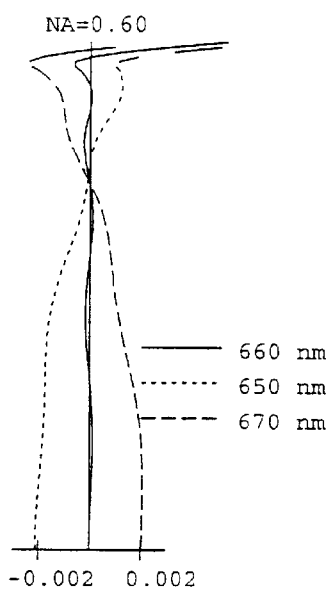
Figure 7C:
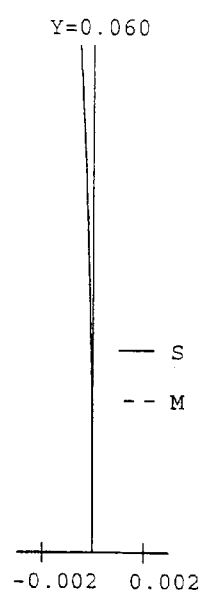
Figure 8A:
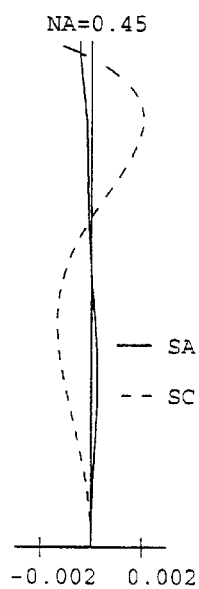
FIGS. 8A, 8B and 8C are graphs showing various aberrations of the optical system shown in FIG. 6 when the second optical disc is applied.
Figure 8B:
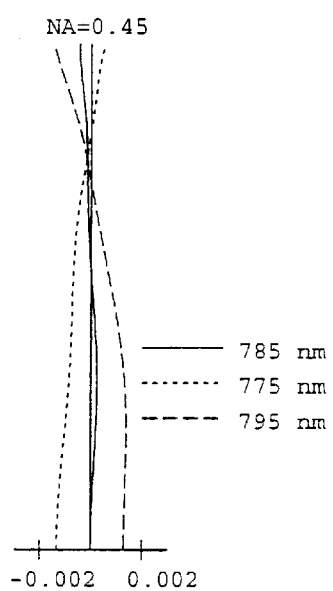
Figure 8C:
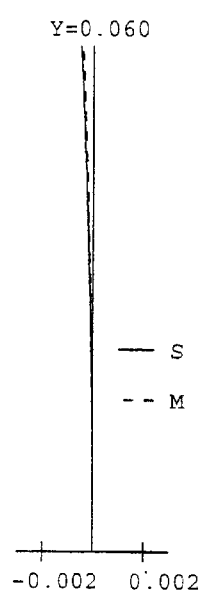

FIGS. 7A, 7B and 7C are graphs showing various aberrations of the optical system shown in FIG. 6 when the first optical disc 30 is applied. FIGS. 8A, 8B and 8C are graphs showing various aberrations of the optical system shown in FIG. 6 when the second optical disc 31 is applied. In view of FIGS. 7A and 8A, it has become clear that the spherical aberrations are well corrected at the wavelengths λ1 and λ2.

Third Embodiment

Figure 9:
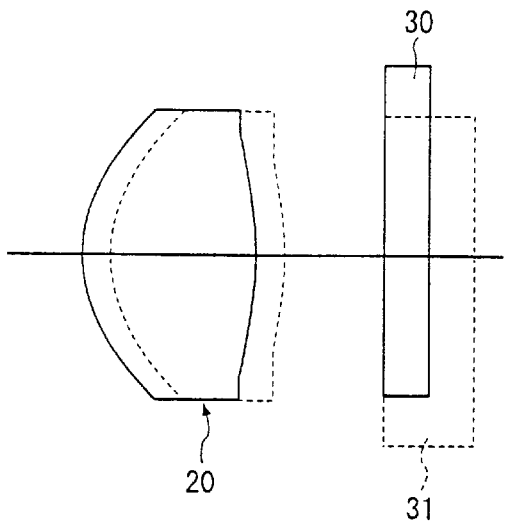
FIG. 9 shows the objective lens of a third embodiment and the optical discs.

FIG. 9 shows the objective lens 20 of the third embodiment and the first and second optical discs 30 and 31. When the first optical disc 30 is used, the objective lens 20 is located at a position illustrated by a solid line. On the other hand, when the second optical disc 31 is used, the objective lens 20 is located at a position illustrated by a dashed line.

The numerical figures of the objective lens 20 of the third embodiment are described in TABLE 5. The constant K and coefficients $A_4$ through $A_{12}$ and the coefficients of the optical path difference function that define the diffractive lens structure are shown in the following TABLE 6.

TABLE 5

| | | | | | |
|---|---|---|---|---|---|
| $\lambda_1$ = 660 nm | $NA_1$ = 0.58 | $f_1$ = 2.8884 | $M_1$ = −0.1579 | | |
| $\lambda_2$ = 785 nm | $NA_2$ = 0.50 | $f_2$ = 2.9057 | $M_2$ = −0.1556 | | |
| $h_{45}$ = 1.47 mm | | | | | |

| Surface number | r | $d_1$ | $d_2$ | n660 | n785 |
|---|---|---|---|---|---|
| #0 | | 20.000 | 20.373 | | |
| #1 | 1.953 | 2.300 | 2.300 | 1.54044 | 1.53665 |
| #2 | −4.018 | 1.702 | 1.329 | | |
| #3 | ∞ | 0.600 | 1.200 | | |
| #4 | ∞ | | | | |

TABLE 6

| | First Surface | Second Surface |
|---|---|---|
| K | −0.560 | 0.000 |
| $A_4$ | −5.764 × 10$^{-3}$ | 3.040 × 10$^{-2}$ |
| $A_6$ | 6.540 × 10$^{-4}$ | −5.427 × 10$^{-3}$ |
| $A_8$ | −2.032 × 10$^{-4}$ | 7.105 × 10$^{-4}$ |
| $A_{10}$ | 8.230 × 10$^{-5}$ | −3.320 × 10$^{-4}$ |
| $A_{12}$ | −2.150 × 10$^{-5}$ | 5.492 × 10$^{-5}$ |
| $P_2$ | −1.000 | |
| $P_4$ | −2.491 | |
| $P_6$ | −5.410×10$^{-2}$ | |

Figure 10A:
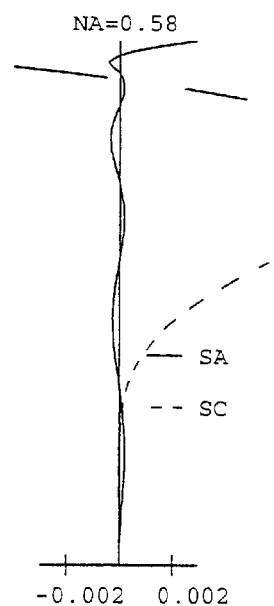
FIGS. 10A, 10B and 10C are graphs showing various aberrations of the optical system shown in FIG. 9 when the first optical disc is applied.
Figure 10B:
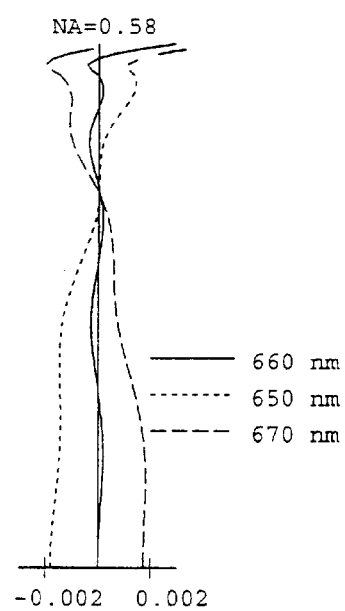
Figure 10C:
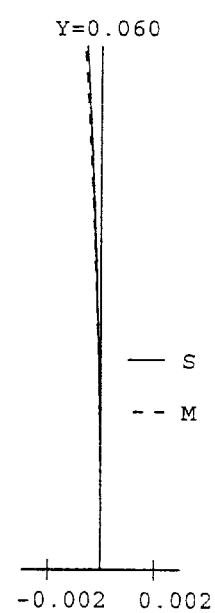

FIGS. 10A, 10B and 10C are graphs showing various aberrations of the optical system shown in FIG. 9 when the first optical disc 30 is applied. FIGS. 11A, 11B and 11C are graphs showing various aberrations of the optical system shown in FIG. 9 when the second optical disc 31 is applied. In view of FIGS. 10A and 11A, it has become clear that the spherical aberrations are well corrected at the wavelengths λ1 and λ2.

The following TABLE 7 shows the values of the intermediate term of the condition (1) in the embodiments. Since all of the embodiments satisfy the condition (1), the diffractive lens structure has an appropriate wavelength dependence of the spherical aberration. Therefore, the variation of the spherical aberration due to the change of the thickness of the cover layer can be canceled by changing the wavelength.

TABLE 7

| | Condition (1) $P(h_{45})/\lambda - P2h_{45}^2$ |
|---|---|
| First Embodiment | −13.05 |
| Second Embodiment | −13.26 |
| Third Embodiment | −12.18 |

As described above, the optical disc apparatus embodying the invention is able to adapt to a plurality of kinds of optical disc whose cover layers are different in thickness by moving the objective lens in the optical axis direction, even if a plurality of emission points are formed in close proximity to each other. Further, when the objective lens has a wavelength dependence such that spherical aberration varies as wavelength of incident laser beam varies, the variation of the spherical aberration due to the change of the thickness of the cover layer can be canceled by changing the wavelength.

The present disclosure relates to the subject matter contained in Japanese Patent Application No. HEI 11-251993, filed on Sep. 6, 1999, which is expressly incorporated herein by reference in its entirety.

What is claimed is:

1. An optical disc apparatus that is adapted for a plurality of kinds of optical discs whose cover layers are different in thickness, said apparatus comprising:

a light source portion that has a plurality of emission points in close proximity to each other, said emission points emitting divergent laser beams at different wavelengths, respectively, said emission points being switched in accordance with the thickness of said cover layer;

an objective lens for converging divergent laser beam from said light source portion onto an information layer of said optical disc through said cover layer thereof;

a light receiving portion that receives the reflected light beam from said optical disc to produce signals; and a focusing mechanism that moves said objective lens such that the distance between said objective lens and said optical disc increases as the thickness of said cover layer decreases, wherein the distances between said respective emission points and the surfaces of said cover layers are constant regardless of the thickness of said cover layer.

2. The optical disc apparatus according to claim 1, wherein said objective lens has wavelength dependence such that spherical aberration varies as wavelength of incident laser beam varies.

3. The optical disc apparatus according to claim 2, wherein said objective lens is provided with a diffractive lens structure formed on either lens surface, said diffractive lens structure has said wavelength dependence.

4. The optical disc apparatus according to claim 3, wherein said diffractive lens structure has the wavelength dependence such that a predetermined order diffraction light at a first wavelength forms an appropriate wavefront for an optical disc having a first cover layer and the same order diffraction light at a second wavelength, which is longer than said first wavelength, forms an appropriate wavefront for an optical disc having a second cover layer, which is thicker than said first cover layer.

5. The optical disc apparatus according to claim 4, wherein said diffractive lens structure has the wavelength dependence such that spherical aberration varies in the undercorrected direction as wavelength of incident light increases.

6. The optical disc apparatus according to claim 5, wherein the following condition (1) is satisfied;

$$-15 < \Phi(h_{45})/\lambda - P_2 \times (h_{45})^2 < -10 \quad (1)$$

where $h_{45}$ is the height from the optical axis of a point where a light ray of which NA is 0.45 intersects said diffractive lens structure, λ is the wavelength of said light, and $P_2$ is a second order coefficient when an additional optical path length added by said diffractive lens structure is expressed by the following optical path difference function $\Phi(h)$:

$$\Phi(h) = (P_2h^2 + P_4h^4 + P_6h^6 + \ldots) \times \lambda$$

where $P_4$ and $P_6$ are coefficients of forth and sixth orders, and h is a height from the optical axis.

7. The optical disc apparatus according to claim 1, wherein the focal length of said objective lens at a first wavelength used for an optical disc having a first cover layer is shorter than the focal length of said objective lens at a second wavelength, which is longer than said first wavelength, used for an optical disc having a second cover layer, which is thicker than said first cover layer.

8. The optical disc apparatus according to claim 7, wherein said objective lens is provided with a diffractive lens structure formed on either lens surface, said diffractive lens structure has wavelength dependence such that spherical aberration varies as wavelength of incident laser beam varies, and wherein said diffractive lens structure has a negative lens power.

9. The optical disc apparatus according to claim 1, wherein said light source portion is provided with two emission points on one chip.

10. The optical disc apparatus according to claim 9, wherein said light receiving portion is mounted on the board on which said light source portion is mounted.

\* \* \* \* \*